July 2, 1946.　　　R. A. WILKINS ET AL　　　2,403,419
METHOD OF RECOVERING THE CONSTITUENTS OF SCRAP BI-METAL
Filed April 15, 1943　　　2 Sheets-Sheet 2
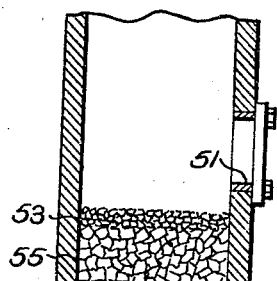
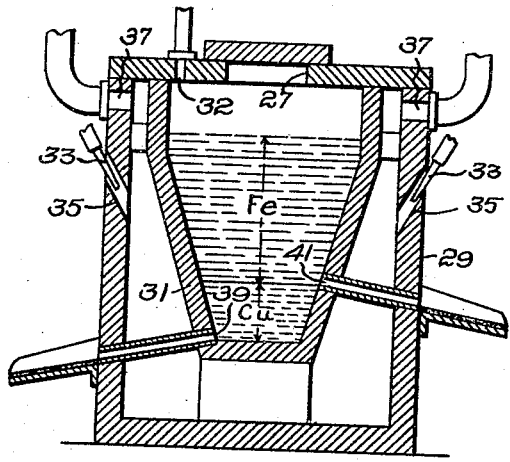
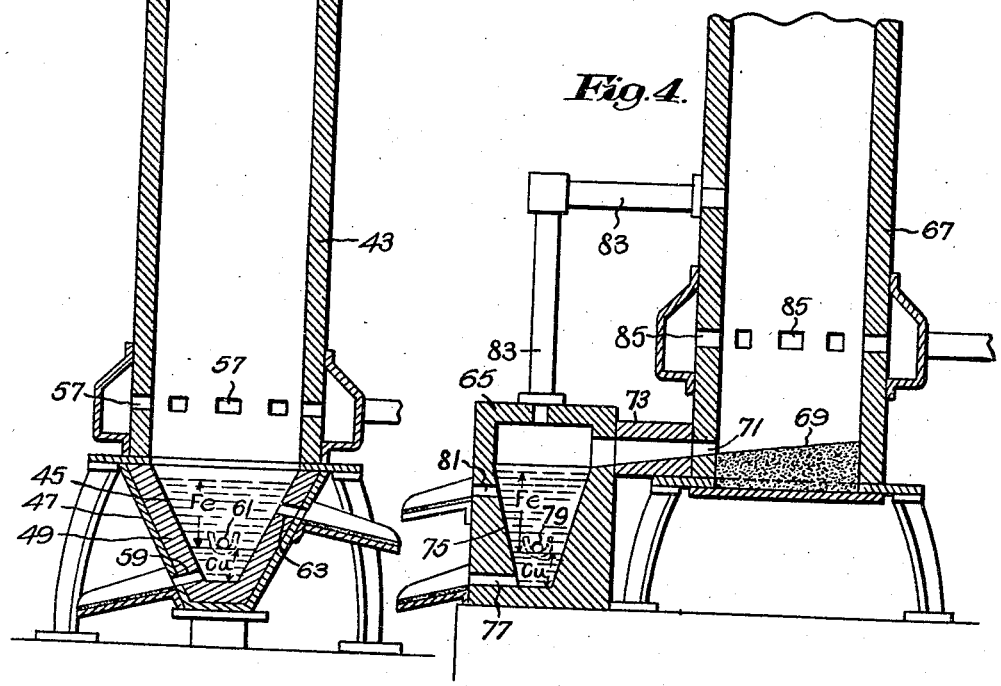
Inventors:
Richard A. Wilkins
Edward S. Bunn.
by Emery Booth Townsend Miller & Weidner
Attys.

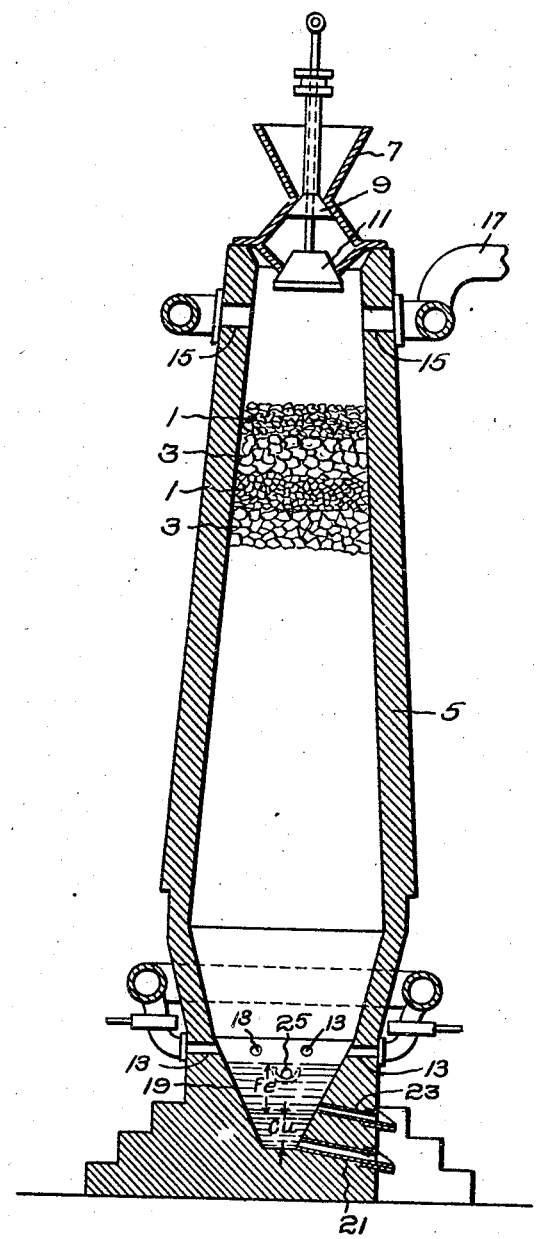

Patented July 2, 1946

2,403,419

UNITED STATES PATENT OFFICE 2,403,419

METHOD OF RECOVERING THE CONSTITUENTS OF SCRAP BI-METAL

Richard A. Wilkins and Edward S. Bunn, Rome, N. Y., assignors to Revere Copper and Brass Incorporated, New York, N. Y., a corporation of Maryland Application April 15, 1943, Serial No. 483,142

8 Claims. (Cl. 75—63)

Our invention relates to separately recovering cuprous and ferrous materials from scrap consisting of iron or steel and associated copper or brass, this application being a continuation-in-part of applicants' pending application Serial Number 464,420, filed November 3, 1942.

A common form of such scrap is sheet bi-metal consisting of sheet mild steel coated with a welded on layer of copper or brass such as gilding metal, the latter consisting of a brass containing about 90% copper and 10% zinc. A typical example of such scrap is sheet mild steel about 0.05 of an inch thick, containing about 0.05 to 0.15% carbon, coated with a sheet of gilding metal about 0.01 of an inch thick welded over its entire surface to the steel. Another form of such scrap consists of turnings from shells having copper shell bands, such scrap consisting of turnings of low carbon steel, commonly containing about 0.3 to 0.5% carbon, mixed with copper turnings. Other common forms of scrap consisting of mild or other low carbon steel mixed or otherwise associated with cuprous material are sheet steel or wire coated with copper or brass other than gilding metal. In all these instances the ferrous material forms the major portion of the scrap, commonly 70 to 85% thereof, and the cuprous material whether in the form of copper or brass the minor portion.

It is highly desirable to recover the importantly strategic metal copper at present tied up in scrap of the above nature, enormous quantities of which, particularly in the form of sheet mild steel coated with gilding metal, are now available. It has heretofore been proposed to effect this recovery by leaching the scrap with ammoniacal compounds, and, although this proposed process is feasible from a technical standpoint, its employment nevertheless is objectionable from an economic standpoint because of the high operating costs and high initial capital investment involved and by reason of the plant designed for performing the process on a commercial scale involving the use of large amounts of strategic materials. It has also been proposed to effect the recovery, in connection with sheet mild steel scrap coated with gilding metal, by heat treating and chlorinating the scrap to render the cuprous material brittle and remove it as a powder by tumbling or otherwise jarring the scrap so treated, but no practical way has been evolved of practising this method on a commercial scale. Further, it has been proposed to take advantage of the lower melting point of the cuprous material, as compared to that of the ferrous material, by heating the scrap to a temperature less than that of iron but above that of the cuprous material so as to melt the latter off, but this it has been found is entirely impractical because of thin layers of the molten cuprous material strongly adhering to the ferrous material on account of the surface tension phenomena involved.

According to the present invention, the ferrous and cuprous materials of the scrap may be separately recovered at a minimum of expense in respect to initial capital investment and operating costs. Further, the practice of the invention on a commercial scale does not involve the use of great amounts of strategic materials, for in such practice there need be employed only existing equipment, or the same with slight and inexpensive modifications, now available at most metallurgical and fabricating plants dealing with ferrous materials.

Applicants have found, that by properly melting and treating the scrap, the ferrous and cuprous constituents of the melt may be rendered substantially mutually insoluble when in a molten condition, and, that by observing certain precautions, the molten mixture may be caused to stratify by reason of the different densities of these constituents, thus permitting cuprous material to be tapped from the bottom portion of the melt and ferrous material to be separately tapped from the upper portion of the melt.

As an alternative procedure the stratified melt may be allowed to solidify and the cuprous material may be separated mechanically from the ferrous material. For example, the containers in which the metals are permitted to stratify may be in the form of vertically positioned, elongated, highly heated, fire-clay molds, preferably conical or pyramidal in shape with the apices pointed downward. Into these molds the melted treated scrap may be poured and allowed slowly to cool to permit the treated metal to stratify and reach the solidifying point after present in the molds for about one-half hour, thus to form billets which at one end portion will consist of cuprous material with the remaining portions ferrous material, making it possible to separate these two portions of the billets by a sawing operation, or, in many instances, by breaking them apart at the line of demarcation between the two portions by striking the billet with a sledge or steam hammer.

In respect to making the ferrous and cuprous materials of the melt mutually insoluble, applicants have found that if the scrap is melted to produce a molten mixture of copper and mild or other low carbon steel very high percentages of the molten copper will dissolve into the molten steel, particularly when a high temperature of the melt is maintained in an attempt to promote stratification as hereinafter explained. In fact it has been found that substantially pure iron will dissolve copper in substantially all proportions. On the other hand, applicants have found that if the steel is enriched with carbon the solubility of the copper therein is pronouncedly decreased. For example, if the steel is enriched with carbon to contain about 1.9% thereof, only about 13.5% copper will dissolve into it, as compared with 90% if the iron contains say 0.1% carbon. By increasing the carbon to 2.5% only about 10% copper will dissolve into it, and, when enough carbon is introduced to form iron containing 4.3% carbon, only about 3% copper will dissolve into it.

Applicants further have found, that if the scrap is melted and the iron contains not more than about 1 to 1.5% carbon, the degree of separation of the ferrous and cuprous materials is inappreciable from an economic standpoint. Under such conditions the iron contains so much dissolved copper that it will not separate readily by stratification from the undissolved copper apparently on account of density and surface tension phenomena involved. Thus, with such low amounts of carbon, not only will a high percentage of dissolved copper be retained in the iron, but the iron will contain a large percentage of free copper dispersed through it, resulting in its being impossible to separate a worthwhile amount of copper from the melt or separate therefrom iron which contains only a reasonable amount of copper. With more than about 1.5% carbon the recovery of iron and copper rapidly increases, reaching a critical value which makes the process economically feasible when the carbon is about 1.75% and upward, although higher percentages of carbon, up to about 4.3% thereof, ordinarily will be desirable to secure as high a recovery of copper as possible.

It has also been found that the introduction of carbon into the ferrous material decreases both its density and its melting point, and for a given temperature makes it more fluid, and hence by these effects acts to promote stratification of the ferrous and undissolved cuprous constituents of the melt.

It has further been found that both silicon and manganese, when dissolved into the iron with the carbon, act to promote the overall rate at which stratification occurs, and also act to increase the amount of undissolved copper recovered. Either or both silicon and manganese used in this connection cause the iron to be more fluid at any given temperature and reduce its density, and hence increase the overall rate at which stratification occurs. This increase is very pronounced as compared to the iron containing only carbon, particularly as stratification progresses and the amount of copper in the unstratified metal mixture is reduced. In fact the necessary time for complete stratification in a commercial sense may in some instances be reduced from about 24 hours to about 30 minutes by introducing silicon and manganese as well as carbon.

In respect to silicon and manganese acting to increase the recovery of copper it has been found that they do this by degasifying the melt prior to stratification. Gases in the melt tend to dissolve in the copper, and tend to be released when the temperature of the melt is lowered or when the pressure on the copper is reduced, such reduction in pressure being caused say by tapping metal from the container in which stratification takes place. When released the gases tend to rise in the form of bubbles from the copper into the iron and carry with them sufficient free copper seriously to reduce in many instances the recovery of the free copper fraction of the melt. Preferably, both silicon and manganese are entered into the melt, manganese acting to degasify the copper in respect to sulphur dioxide, which is commonly present because of the sulphur content of the fuel, and silicon acting to degasify it in respect to other gases.

Preferably the manganese and silicon are entered in the form of ferro-manganese and ferro-silicon so that the manganese and silicon will dissolve into the iron of the scrap rather than into the copper. However, because of the intimate mixture of the ferrous and cuprous materials prior to stratification, the manganese and silicon act to scavenge the copper in the respects mentioned. Sufficient ferro-manganese to dissolve about 0.1 to 1% manganese into the iron, and sufficient ferro-silicon to dissolve about 0.5 to 5% silicon into it, may be employed. Preferably enough of these to dissolve into the iron about 0.5% manganese and about 1.5% silicon is employed. However, if no sulphur is present in the melt, the manganese may be omitted. It will be understood in these connections that manganese and silicon, although giving improved results and for that reason preferably employed, need not necessarily be employed.

Further it has been found, that when enriching the mild steel with carbon, the zinc content of any brass present may at the same time be readily removed by practice of the improved method, so that the melt subjected to stratification will in effect consist substantially exclusively of molten cast iron and copper.

The copper fraction of the scrap recovered by the improved process commonly will contain small amounts of free iron dispersed therein, usually about 2 or 3% thereof. If desired, the copper recovered may then be treated for removing the iron impurities, for example may be treated for this purpose in a so-called anode, scorifying, or other suitable furnace for oxidizing or otherwise burning off the iron impurities, so as to give fire refined copper, and if desired the latter may be cast into anodes for further refining.

The carbon enriched iron recovered by the improved process will contain small amounts of dissolved copper, the exact amount of copper largely depending upon the amount of carbon entered into the iron as above explained. Ordinarily, when approximately full advantage is taken of the conditions governing successful operation of the process, this amount of copper will not exceed about 5% including dissolved copper. Such iron is useful for many industrial applications, and, further, may be usefully employed as a substitute for iron containing nickel as an addition to steel in forming alloy steel.

Convenient forms of apparatus for practising the improved process are more or less diagrammatically illustrated by the accompanying drawings, in which:

Fig. 1 is a somewhat schematic vertical section of a standard blast-furnace slightly modified better to adapt it for use in practising the improved process;

Fig. 2 is a somewhat schematic vertical section of one form of so-called holding-furnace for use in practising the improved process;

Fig. 3 is a somewhat schematic vertical section of a standard cupola-furnace slightly modified better to adapt it for use in practising the improved process; and Fig. 4 is a somewhat schematic vertical section of the lower portion of a standard cupola-furnace with an attachment for better adapting it for use in practising the improved process.

In practising the invention with the form of apparatus shown by Fig. 1 the procedure followed is in general the same as that of reducing iron ores in a blast-furnace. Alternate layers of scrap 1 and by-product coke 3 may be placed in the furnace by entering them successively into the top of the furnace from the hopper 7 by manipulation of the bells 9 and 11 the same as is done in blast-furnace practice. If desired the scrap may be baled to facilitate its being readily handled. Combustion of the coke may be maintained by entering controlled amounts of heated air into the lower portion of the furnace through the tuyères 13, the products of combustion from the furnace, including any zinc fumes which may be evolved, discharging from the top portion of the furnace through openings 15 leading to a conduit 17 for conducting such products to any convenient place of disposal.

As shown, the bottom of the furnace is shaped, say by redesigning that portion of a standard blast-furnace, to form a chamber for collecting a vertically elongated pool of the molten metal. Preferably this chamber, because of the preponderant amount of iron in the melt, is made substantially conical in shape as indicated at 19. The molten ferrous and cuprous materials will collect in this chamber and will separate by stratification, the cuprous material collecting at the bottom of the pool of molten metal as indicated by the dimensional lines and symbols "Fe" and "Cu" on the drawings. As shown, a normally plugged tap 21 communicating with the lower portion of the chamber is provided for tapping off the molten cuprous material, and above this tap is provided a normally plugged second tap 23 for tapping off the ferrous material, while slag may be removed from above the ferrous material at the upper portion of the chamber through a normally plugged tap 25.

The furnace is preferably operated continuously, fresh charges of coke and scrap being entered from time to time to keep the furnace filled to the desired level, and, preferably, the furnace is of such height that a column of coke and scrap at least 25 feet high, measured from the tuyères, can be maintained. As the coke is consumed the scrap melts and gradually trickles through the ignited incandescent coke. The combustion of the coke produces large amounts of carbon dioxide which is reduced by the ignited coke to carbon monoxide, the latter in conjunction with the ignited coke acting to enrich with carbon the molten iron trickling through the coke, such enrichment however being largely accomplished by the carbon monoxide. To promote this action preferably the air entered into the furnace through the tuyères is preheated to a temperature of about 350 to 800° F. The amounts of air which it is necessary to enter into the furnace will depend upon the size and melting capacity of the latter. Ordinarily satisfactory results will be secured by charging about 350 to 400 pounds of by-product coke for each 1000 pounds of the iron content of the scrap charged, and, for this amount of coke and iron, forcing about 5000 to 6000 cubic feet (reduced to atmospheric pressure and normal temperature) of preheated air through the tuyères per minute. Under these conditions the gas discharging from the furnace will contain about 20% carbon monoxide.

Preferably, at the start of operations, the furnace is charged with coke to the normal height of the charge and the coke is ignited and the draft turned on to burn the coke, those conditions being maintained for a sufficient period to heat the coke to incandescence and preheat the furnace, such additional coke as may be necessary being added to maintain the height of the column. After the coke is heated to incandescence, and the furnace is thoroughly preheated, the charging of scrap and additional coke may be commenced.

By use of a blast-furnace the iron may be readily enriched with 4 to 6% carbon. For insuring degasification of the molten metal for the reasons above explained sufficient ferro-manganese and ferro-silicon may be entered with the charge of scrap to insure the necessary amounts of manganese and silicon in the iron.

Preferably a small amount of limestone, say 50 to 100 pounds thereof per ton of iron entered into the furnace, the exact amount depending upon the ash content of the coke, may be charged into the furnace with the coke or scrap so that lime, instead of iron, will go into the slag. Further, if desired, with the limestone may be charged a small amount of sodium carbonate, say about 4 pounds thereof per ton of iron, to reduce the amount of sulphur dissolved into the metal.

When the scrap contains brass as, for example, when it consists of bi-metal clad with gilding metal, the zinc will be driven off in the upper portions of the furnace and escape in the form of fumes through the charging ports 15. At the final temperatures existing, which preferably are about 2500 to 2800° F., the molten metal, which collects at the bottom of the furnace, will contain substantially no zinc, the final fraction of the zinc, usually amounting to about 0.2%, going off with the slag.

It will be understood that in operating the furnace substantially continuously, so that metal is constantly collecting in the pool at the bottom of the furnace, although the copper tapped from the lower portion of the pool will contain a minimum amount of iron, the iron tapped off will contain a large amount of copper.

For recovering the copper from the molten ferrous material tapped from the furnace, such material may be collected in a ladle and poured, for further treatment, into any form of suitable holding-furnace as, for example, that illustrated in Fig. 2.

In the example of holding-furnace shown by Fig. 2 the metal is poured from the ladle through the opening 27 in the top of the furnace casing 29 into a vertically elongated pot 31 having a conical-shaped bottom portion, an opening 32 in the top of the casing being provided for venting gases from the pot. As shown, the furnace is of the oil-fired type in which 33 represents an oil burner nozzle for discharging an ignited mixture of oil and air through openings 35 into the furnace casing for heating the pot 31, the products of combustion escaping from the top of the furnace casing through openings 37. As shown, the pot is provided with a tap 39 communicating with its bottom portion for tapping off the cuprous material, and, intermediate its height, with a tap 41 for tapping off the iron.

It will be understood that other forms of holding-furnaces may be employed, for example, when practising the invention on a large scale, the well known type of rotary furnace comprising a horizontal, cylindrical, interiorly refractory lined drum, into which an oil and air flame is projected above the molten metal to keep the latter hot, the drum being axially rotatable without rotating the metal so as to bring a pouring spout below the metal level when it is desired to pour, in which way with such furnace the stratified metals may be separately poured.

In cases where the surface of the metal in the holding-furnace is subjected to heated gaseous products or flame for maintaining it molten, as would be the case with the above described rotary type of furnace, the surface of the metal may be covered with a layer of protective flux, say a mixture of sand and sodium carbonate, for preventing absorption of gases into the metal to the end of promoting effective separation of the iron and copper, as also above described.

Preferably, the metal is maintained at a high temperature in the holding-furnace, say for example 200 to 400° F. above the melting point of iron, to promote stratification by keeping the iron as fluid as possible. This temperature also preferably should not be less than that at which the metal is tapped from the furnace, so as to minimize escape from the copper of any gases dissolved in it, which gases tend to be liberated if the copper is permitted to cool during the progress of stratification, and, when liberated, tend to carry free copper into the iron as above explained. In all cases the holding-furnace should be vented to permit escape of such gases as happen to be liberated from the metals.

The metal in the holding-furnace is preferably maintained in a quiescent condition to promote stratification. In cases where the scrap is continuously melted it will for this purpose be necessary to employ at least two holding-furnaces, in one of which the metal stands quiescent while the other is being charged. The number of holding-furnaces necessary will of course depend upon their metal holding capacity relative to the rate at which metal is melted in the melting-furnace.

It has been found that after the molten metal remains quiescent in the holding-furnace from 15 to 30 minutes, depending upon the fluidity of the iron, which fluidity as above explained for a given temperature is largely determined by the carbon content of the iron, the copper collected will contain only a small amount of iron, and the iron collected only a small amount of copper, as above explained. The copper removed may be cast into pigs, as well as may be the iron, or the copper may be removed to a refining-furnace for treating it to remove such iron impurities as it may contain, as also above explained.

Instead of employing a blast-furnace as above described, a cupola-furnace, such as is commonly employed for melting cast iron pigs, may be employed for practising the process. However, in such case the cupola-furnace should be operated to produce the effect of a blast-furnace and, if necessary, the cupola should be modified or altered to permit such effect to be secured. Ordinarily but about 75 pounds of by-product coke are employed for each 500 pounds of iron to be melted in a cupola-furnace, which amount of coke will have no appreciable effect in respect to carburizing the iron. In carrying out the improved process, however, this amount of coke with relation to the iron should be much increased, preferably about 150 to 225 pounds of coke being employed for each 500 pounds of iron in the scrap charged to the furnace. Also, preferably, the air entered into the tuyères should be pre-heated, and the amount thereof increased much above that employed in standard cupola practice, to insure the formation of the requisite amount of carbon monoxide so as to enrich the iron of the scrap with carbon. Best results are also secured by raising the tuyères of the standard cupola-furnace to about twice their usual distance above the hearth to prevent oxidation of the melted iron at the bottom of the furnace, and, further, best results will be secured by raising the charging port to a considerably greater distance above the tuyères than found in the ordinary cupola, so as to secure a longer column of coke.

A modified form of cupola-furnace suitable for practice of the invention is shown in Fig. 3. As shown, for the removable bottom of a standard cupola-furnace 43 a vertically elongated, conical pot 45 is substituted, the pot being conveniently formed with an outer steel shell 47 lined interiorly with a refractory layer 49 of firebrick or other refractory material. The cupola may be charged through the charging port 51 with scrap and coke to form alternate layers of scrap 53 and coke 55 to keep the furnace filled to just below the port. Combustion of the coke is supported by the air entered into the lower portion of the furnace through the tuyères 57. As the charge is melted it trickles through the column of the incandescent coke and is enriched with carbon by intimate contact with the ascending carbon monoxide. The molten metal collects in the pot 45 in which it stratifies to form a mass of molten cuprous material at the bottom of the pot with a superimposed mass of molten ferrous material. The cuprous material may be tapped from the pot from time to time through the tap 59 and the ferrous material through the tap 61, while slag may be removed through the tap 63 at the upper portion of the pot.

As shown in Fig. 4, the cupola-furnace is provided with a fore-hearth 65 in which the molten metal in the cupola is permitted to stratify. With the apparatus shown by Fig. 4 the scrap melted in the cupola 67, when it reaches the bottom 69 thereof, will flow through the opening or cupola breast 71 through a conduit 73 of refractory material into the fore-hearth. As shown, the fore-hearth may be in the form of a cylindrical container of refractory material having its bottom portion formed to provide a vertically elongated, conical chamber 75. In this chamber the molten metal will stratify, permitting the cuprous material to be tapped therefrom through the tap hole 77 and the ferrous material containing a large amount of copper through the tap hole 79, while slag may be removed through the tap hole 81. A blast will strike strongly through the open breast and keep the molten metal in the fore-hearth hot. Exit of hot cupola gases from the fore-hearth is provided by the pipe 83 communicating with the cupola well above the tuyères 85.

The fore-hearth employed may take various forms, for example, may be of the well known removable type mounted for rotation on a horizontal axis so that the metal contained therein may be readily poured.

It will be understood that the cupola-furnace will be operated substantially continuously, and that the cuprous and ferrous materials tapped from the cupola may be handled in the ways above described in connection with the blast-furnace, the ferrous material so tapped being treated in a holding-furnace for the recovery of its copper content.

The exact conditions necessary to be maintained in the practice of the invention will vary somewhat with the size of the cupola-furnace employed and the nature of the scrap. These conditions, however, will be apparent to those skilled in the art from the following specific example of the practice of the method utilizing such a furnace.

Assuming there is available a standard cupola-furnace of the type shown in Fig. 4, but without a fore-hearth, the cupola having an internal diameter of 42 inches, the water jacketed tuyères of this furnace, positioned 16 inches above the bottom or hearth 69 of Fig. 4, may be raised to about 33 inches above it to insure against the blast entered through the tuyères oxidizing the iron of the molten metal collecting at the bottom of the furnace. The charging door, which in such a standard furnace is about 14.5 feet above the tuyères, preferably should be raised to position it about 20 feet above them to provide a longer column of coke. In operating this cupola it preferably should be first filled with a column of by-product coke and the coke burned for one hour with a blast of about 2500 to 3000 cubic feet (reduced to atmospheric pressure and normal temperature) of air per minute entered through the tuyères to bring the column of coke to incandescence and preheat the furnace prior to charging scrap, the air being preferably preheated, say from 350 to 650° F. Such coke as is necessary to maintain a column of requisite height may be entered during this period. When the scrap employed consists of sheet mild steel about 0.05 of an inch thick coated with a layer of gilding metal about 0.01 of an inch thick, alternate layers of this scrap and coke may be entered into the furnace at such rate as to melt about 3 to 3½ tons of scrap per hour. For each 500 pounds of scrap entered 175 to 200 pounds of by-product coke should be entered, preferably with about 25 pounds of limestone, 1 pound of sodium carbonate, and sufficient ferro-manganese and ferro-silicon to insure the presence of about 0.5% manganese and about 1.5% silicon in the melt. After the scrap is entered the air blast may be increased to about 5500 to about 6000 cubic feet per minute. The molten metal may be tapped from time to time through the breast 71 of Fig. 4, which under these conditions is normally plugged, into a rotary holding-furnace of the type hereinbefore described, such stratification as may occur in the cupola being ignored. Prior to entering the melt into the holding-furnace the latter may be preheated to about the temperature of the melt, namely, to about 2500 to 2800° F. Upon the surface of the molten metal in the holding-furnace may be maintained a heavy layer of molten sodium carbonate for protecting the molten metal from the combustion gases in the furnace. Two such holding-furnaces may be employed, each of sufficient capacity to permit the molten metal charged thereinto to remain quiescent for about 30 minutes to enable the molten iron and copper to stratify. Pigs cast of the iron tapped from the holding-furnace will contain about 3½% carbon and about 6% copper. Pigs cast of the copper tapped from the holding-furnace will contain about 3% iron.

It will also be understood, that although it is preferred to melt the scrap in the presence of combustible carbonaceous material and carbon monoxide in a stack-type melting-furnace, other forms of melting-furnace may be employed and the carbon entered into the iron in other known ways of carburizing iron. In such cases, however, the results commonly will not be as satisfactory as those secured in the preferred way of practising the method. Still further, it will be understood that partial stratification of the melt need not be effected prior to charging the molten metal into the holding-furnace as, for example, the molten metal may be tapped substantially continuously from the melting-furnace without maintaining a pool of metal in that furnace or in a fore-hearth in which stratification can occur, or all the metal may be tapped from the pool and such stratification as occurs therein be ignored as, for example, is the case in the above mentioned specific example of practising the invention by use of a cupola-furnace.

It will be understood, that within the scope of the appended claims, wide deviations may be made from the forms of the invention described without departing from the spirit of the invention.

We claim:

1. The method of separately recovering cuprous and ferrous constituents of scrap consisting of low carbon steel and associated copper or brass which comprises melting the scrap, enriching the molten ferrous constituent with carbon, silicon and manganese to cause it to contain at least about 2% carbon, at least about 1.5% silicon, and at least about 0.3% manganese, and separating ferrous and cuprous constituents of the scrap so treated by permitting them to stratify while in the molten condition at temperatures above the melting point of the carbon enriched ferrous constituent.

2. The method of separately recovering cuprous and ferrous constituents of scrap bi-metal consisting of mild steel coated with a welded on layer of gilding metal which comprises charging a vertical stack-like furnace with coke to form an elongated coke column; burning the coke while blowing the column with an ascending blast of air thoroughly to ignite the column and heat the furnace to a temperature above the melting point of the scrap; charging scrap, coke, ferro-manganese and ferro-silicon to the heated furnace while continuing the blast whereby to melt the scrap, distill off the zinc of the brass, and enrich the molten ferrous constituent of the scrap with at least about 1.75% carbon and dissolve at least about 0.5% silicon and at least about 0.1% manganese into it, the amount of coke and scrap charged being sufficient to maintain the column; the blast and the amount of coke in proportion to the ferrous constituent of the scrap being such as to produce sufficient carbon monoxide to effect such enrichment of said ferrous constituent with carbon; withdrawing molten scrap so treated from beneath the column into a container and holding it quiescent in the latter at temperatures above the melting point of the carbon enriched ferrous constituent to permit the ferrous and cuprous constituents thereof to stratify.

3. The method of separately recovering cuprous and ferrous constituents of scrap consisting of low carbon steel and associated copper or brass which comprises melting the scrap, incorporating into the molten ferrous constituent of the scrap sufficient carbon, silicon and manganese to cause said constituent to contain at least 1.75% carbon, at least 0.5% silicon, and at least 0.1% manganese, and separating ferrous and cuprous constituents of the scrap so treated by permitting them to stratify while in the molten condition at a temperature above the melting point of the ferrous constituent containing said carbon, silicon and manganese.

4. The method of separately recovering cuprous and ferrous constituents of scrap consisting of low carbon steel and associated copper or brass which comprises melting the scrap, incorporating into the molten ferrous constituent of the scrap sufficient carbon and silicon to cause said constituent to contain at least 1.75% carbon and at least 0.5% silicon, and separating ferrous and cuprous constituents of the scrap so treated by permitting them to stratify while in the molten condition at a temperature above the melting point of the ferrous constituent containing said carbon and silicon.

5. The method of separately recovering cuprous and ferrous constituents of scrap consisting of low carbon steel and associated copper or brass, which comprises passing the scrap in molten condition downwardly through an elongated column comprising ignited coke; decreasing the density and solubility for copper of the molten ferrous constituent by blowing the column with an ascending blast of air for burning the coke and producing carbon monoxide, the latter treating the scrap as it descends through said column for enriching its ferrous constituent with carbon to bring its carbon content up to at least about 1.75% for securing said decrease in density and solubility for copper; also feeding to the upper portion of said column sufficient ferro-silicon to dissolve an appreciable amount of silicon, not less than about 0.5%, into the ferrous constituent of the scrap; and separating ferrous and cuprous constituents of scrap so treated by permitting them to stratify while in the molten condition at temperatures above the melting point of the carbon enriched, silicon-containing, ferrous constituent.

6. The method of separately recovering cuprous and ferrous constituents of scrap consisting of low carbon steel and associated copper or brass which comprises charging the scrap and coke into a stack-like furnace above an elongated column therein comprising ignited coke, the amount of coke and scrap charged being sufficient to maintain said column as the coke burns and the molten scrap is removed from beneath the stack, blowing said column with a vertically ascending blast of air to burn the coke and produce carbon monoxide, whereby to melt the scrap and to treat with carbon monoxide the molten scrap as it descends through said column for enriching the molten ferrous constituent of the scrap with sufficient carbon to bring its carbon content up to at least about 1.75%, also charging into said furnace above said column sufficient ferro-silicon to dissolve an appreciable amount of silicon, not less than about 0.5%, into the ferrous constituent of the scrap, withdrawing treated molten scrap from the bottom portion of said stack and separating ferrous and cuprous constituents of the scrap by permitting them to stratify while in the molten condition at temperatures above the melting point of the carbon enriched, silicon-containing, ferrous constituent.

7. The method of separately recovering cuprous and ferrous constituents of scrap consisting of low carbon steel and associated copper or brass, which comprises passing the scrap in molten condition downwardly through an elongated column comprising ignited coke; decreasing the density and solubility for copper of the molten ferrous constituent by blowing the column with an ascending blast of air for burning the coke and producing carbon monoxide, the latter treating the scrap as it descends through said column for enriching its ferrous constituent with carbon to bring its carbon content up to at least about 1.75% for securing said decrease in density and solubility for copper; also feeding to the upper portion of said column sufficient ferro-silicon and ferro-manganese to dissolve appreciable amounts of silicon and manganese, not less than 0.5% and 0.1% respectively, into the ferrous constituent of the scrap; and separating ferrous and cuprous constituents of scrap so treated by permitting them to stratify while in the molten condition at temperatures above the melting point of the carbon enriched, silicon- and manganese-containing, ferrous constituent.

8. The method of separately recovering cuprous and ferrous constituents of scrap consisting of low carbon steel and associated copper or brass which comprises charging the scrap and coke into a stack-like furnace above an elongated column therein comprising ignited coke, the amount of coke and scrap charged being sufficient to maintain said column as the coke burns and the molten scrap is removed from beneath the stack, blowing said column with a vertically ascending blast of air to burn the coke and produce carbon monoxide, whereby to melt the scrap and to treat with carbon monoxide the molten scrap as it descends through said column for enriching the molten ferrous constituent of the scrap with sufficient carbon to bring its carbon content up to at least about 1.75%, also charging into said furnace above said column sufficient ferro-silicon and ferro-manganese to dissolve appreciable amounts of silicon and manganese, not less than 0.5% and 0.1% respectively, into the ferrous constituent of the scrap, withdrawing treated molten scrap from the bottom portion of said stack and separating ferrous and cuprous constituents of the scrap by permitting them to stratify while in the molten condition at temperatures above the melting point of the carbon enriched, silicon- and manganese-containing, ferrous constituent.

RICHARD A. WILKINS.
EDWARD S. BUNN.